United States Patent [19]

Brence et al.

[11] Patent Number: 5,602,433
[45] Date of Patent: Feb. 11, 1997

[54] MODULAR DRIVE COMPONENT FOR A VIBRATORY FEEDER DEVICE

[75] Inventors: David A. Brence, Blairsville; Kenneth M. Marshall, Indiana, both of Pa.

[73] Assignee: FMC Corporation, Chicago, Ill.

[21] Appl. No.: 339,225

[22] Filed: Nov. 10, 1994

[51] Int. Cl.⁶ ................................................. H02K 33/12
[52] U.S. Cl. .......................... 310/17; 310/15; 310/36; 198/752.1
[58] Field of Search .................. 310/15, 17, 20, 310/36, 37, 81; 198/752.1, 769

[56] References Cited

U.S. PATENT DOCUMENTS 5,127,512  7/1992  Frölich et al. ............................ 198/751
5,287,027  2/1994  Marshall et al. ........................... 310/21
5,293,987  3/1994  Marshall et al. ......................... 198/769
5,462,155  10/1995  Demar et al. ............................ 198/760

*Primary Examiner*—Steven L. Stephan
*Assistant Examiner*—Judson H. Jones
*Attorney, Agent, or Firm*—Michael C. Penn

[57] ABSTRACT

Means and apparatus for use in a vibratory device such as an artide feeder. Said apparatus including a housing having changeable side plate selected from a group of side plates of different mass in order to allow mass adjustment of the artide feeder driving mass dependent on driven mass requirements. The vibratory device may also be associated with at least another vibratory device in either tandem or siamised Configurations by side plate selection.

18 Claims, 5 Drawing Sheets

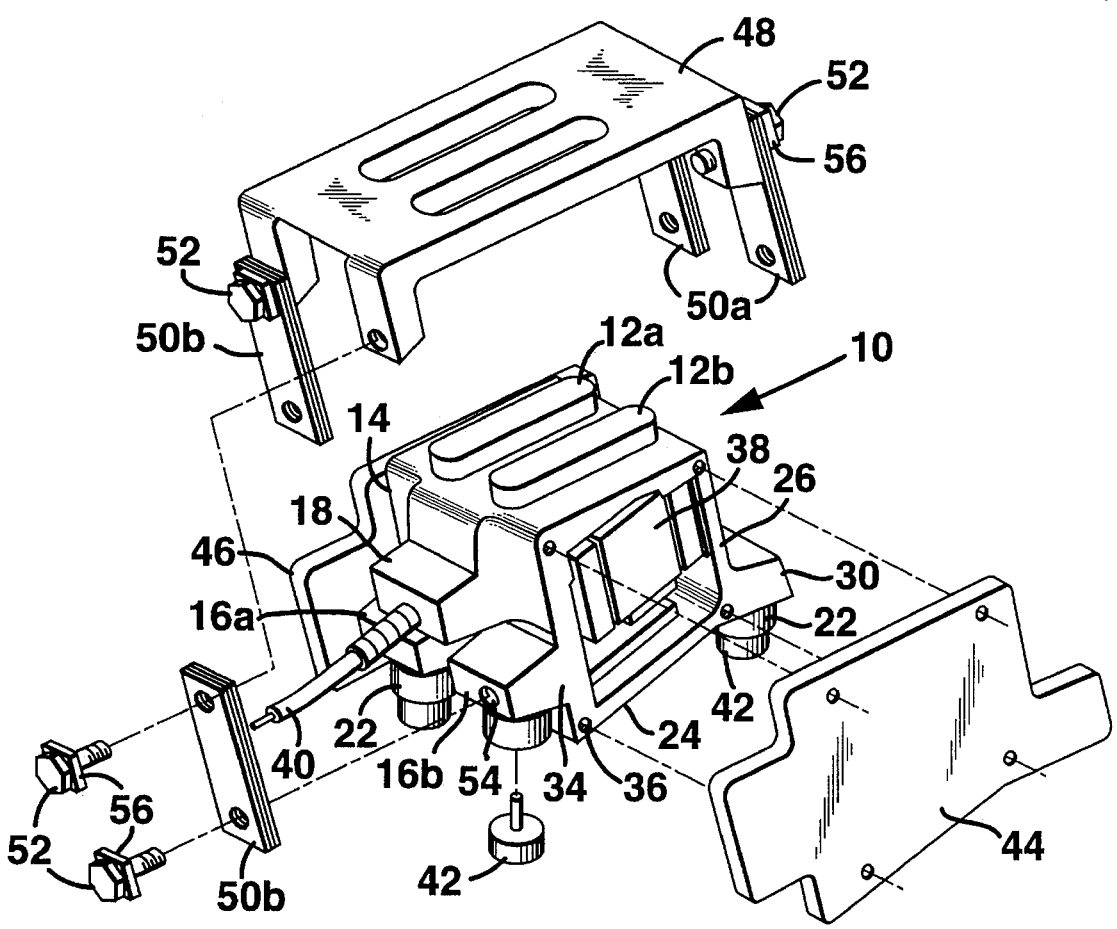

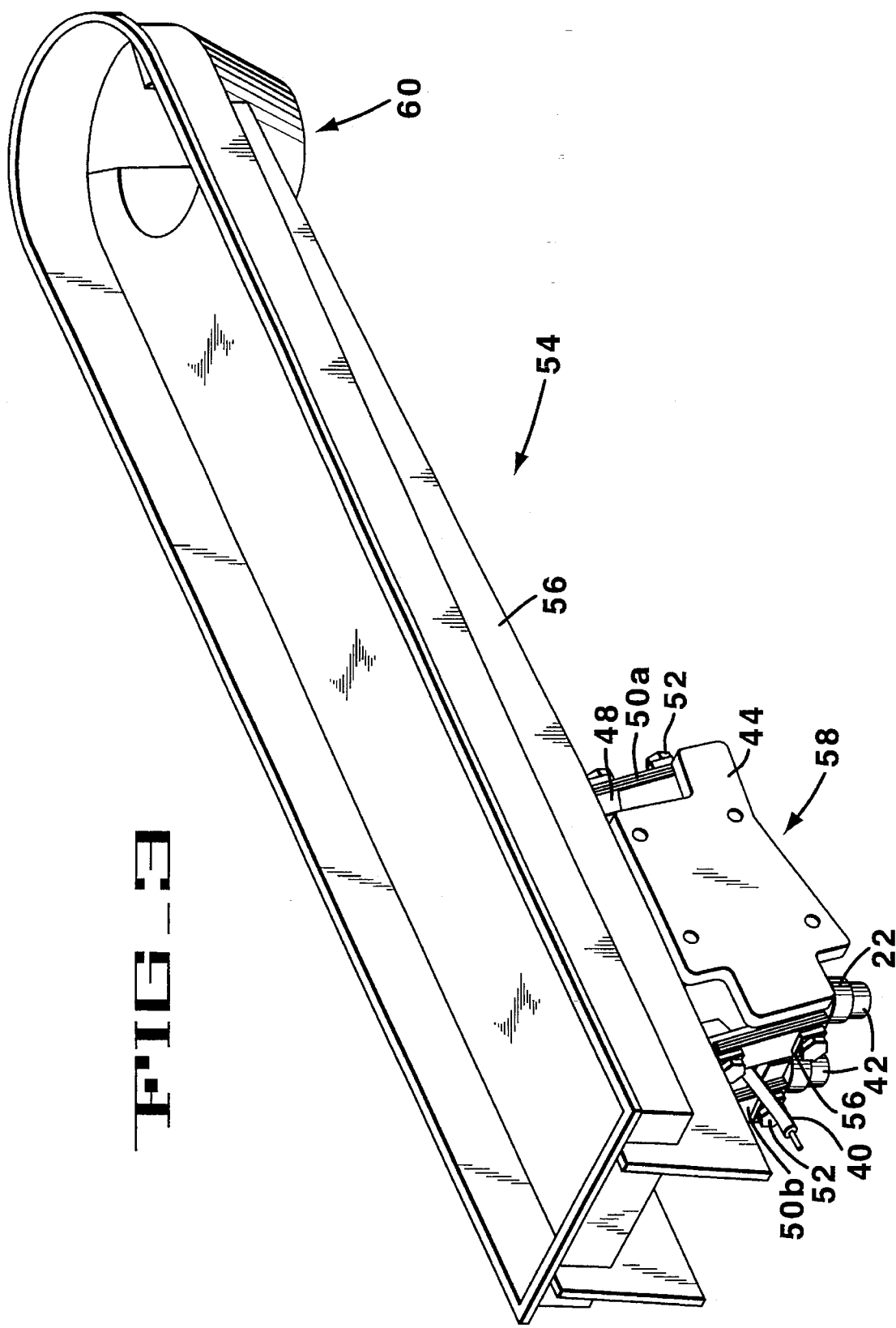

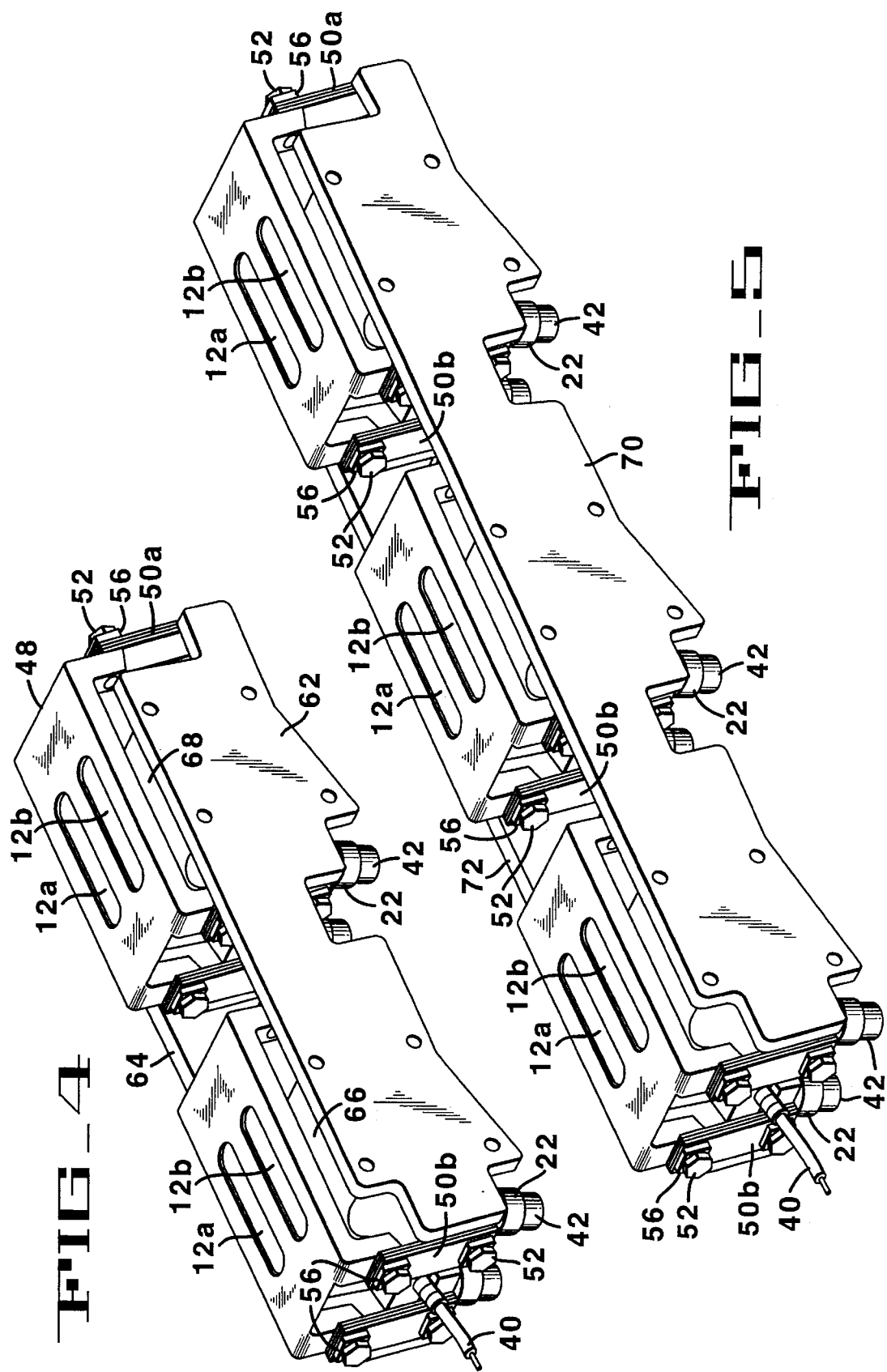

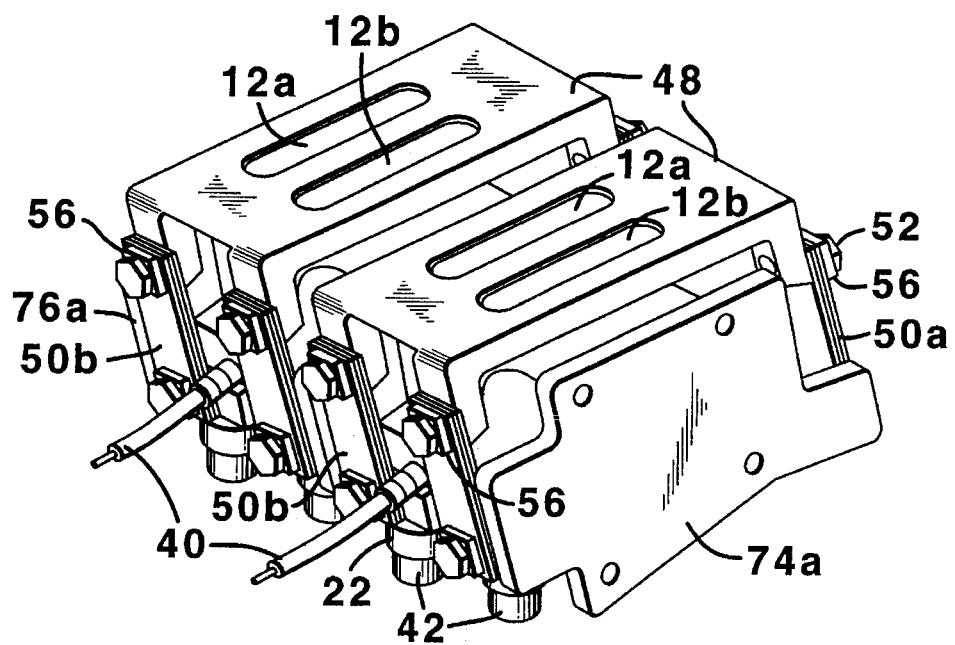
FIG_6
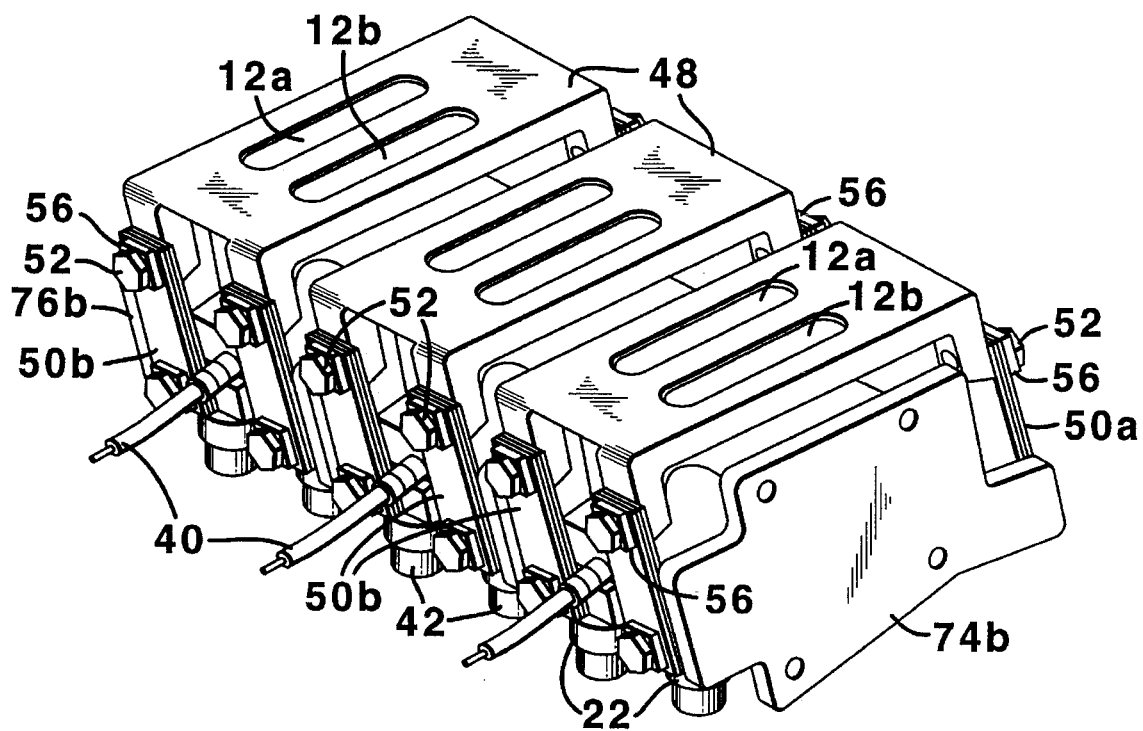
FIG_7

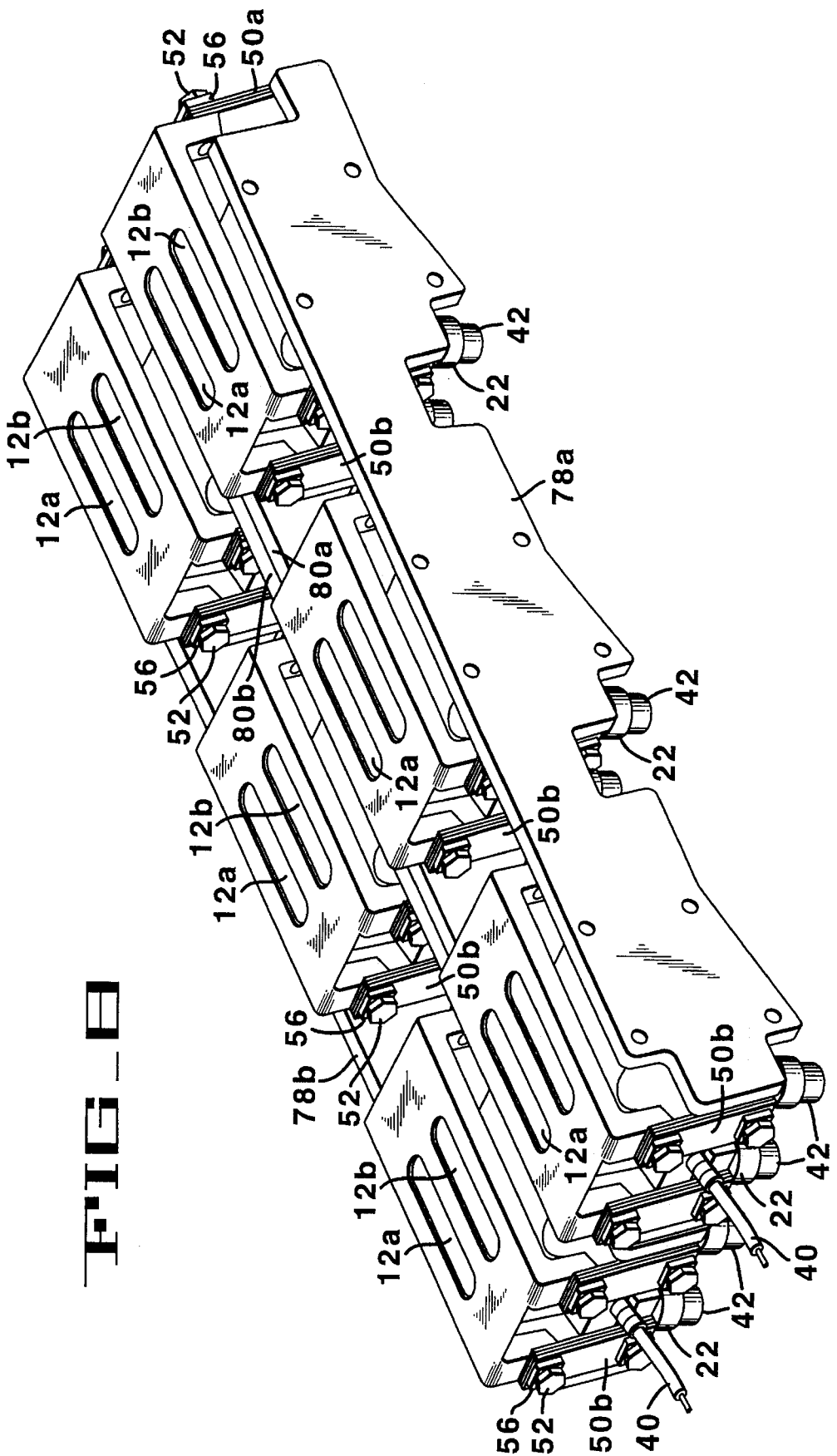

MODULAR DRIVE COMPONENT FOR A VIBRATORY FEEDER DEVICE

BACKGROUND OF THE INVENTION

1) Field of the Invention

This invention has to do with electromagnetic vibratory drive units. More specifically, it has to do with drive units that are provided with removable side plates. These side plates are removed and replaced with other side plates either as a mass adjustment means or as a means to configure multiple vibratory drive units together in tandem or siamesed configurations. These drive unites are integral with vibratory feeders known as two mass feeders which are used extensively in the material handling equipment arena.

2) Description of Related Art

The prior art closest to this invention is represented by the applicant's assignee's own product line. Although vibratory feeders housing some of the features disclosed and discussed herein are available, the products of FMC Corporation, the assignee, are representative of the prior art. FMC Corporation's vibratory feeder model BF-2 shows the use of two drive units or vibratory exciters in driving a single product delivery trough. These drive units are mounted one behind the other under the trough of the feeder. They are independent units that are not connected together directly but rather are both attached to the bottom of the trough. This is an acceptable arrangement but is not an optimized embodiment. The difficulty is that the feeder trough has to be made very stiff and heavy in order to minimize its effect as a spring between the two vibratory drives. It is, the feeder trough, is not stiff enough the flexible trough will set up resonances that prevent smooth product drive and flow of the product throughout the length of the trough.

The prior art vibratory feeder devices do not include the modular structure of this invention. The modular structure allows the feeder to be assembled from a fewer number of stock components for a range of machine capacities than would have been necessary if a similar range of machine capacities had to be made from non-modular assemblies. For example the range of mass of the second mass, the trough of the feeder and the feeder mounting brackets that the vibratory feeder can drive, subject to holding the stroke of the feeder trough in the range of 0.070" to 0.100" ins in the range of 20 lbs to 30 lbs. The modular unit hereof in the basic configuration, that is, with a single drive and what are termed "light side plates"—will have a range of 54 lbs to 84 lbs.

In related applications of vibratory electromechanical exciters wherein an exciter or drive unit is used to drive a feed conveyor, including a product delivery trough, it is known to use multiple drive units to drive a single trough. The trough referred to herein is a generally elongated channel open at a discharge end thereof. Its use, in a normal embodiment is to move product from a bin or hopper to a second processing station such as a packaging station. As these troughs can be quite long it has not been unusual to see two drive units, spaced apart and independent of each other attached to and driving such a single trough. This presents at least two problems. First, the trough itself has to be rigid enough to ensure that there is no untoward flexation of the trough between the two drive units. This means that the trough has to be massively reinforced and gusseted to control such flexure and supply the necessary rigidity. The extra mass of the now rigid conveyor requires a larger pair of drive units then would normally be needed if the trough were of the unenhanced configuration. A second problem, although this is a lesser problem, is that there may be a tuning problem between the two or more drives. This is not difficult to control or adjust for—particularly where the trough has been structurally enhanced—however, it has to be addressed.

Another problem with the known application of vibratory exciters is that since the mass relationship between the trough and the undriven structure of the feeder is crucial to good feeder performance, it has been important to have, as a manufacturer, a wide range of masses of feeder drives to accommodate a wide range of trough masses. This is detrimental as it requires an inventory of many feeder drives and doesn't provide economies of scale conducive to good cost control measures.

It has been the practice in the industry to add mass to a two mass system to arrive at a desired ration between the first mass and the second mass of a system. This desired ratio is seldom a one-to-one ratio but is usually a ratio where the base mass on first mass is a multiple of the second mass. For instance, if the second mass weighs twenty pounds the base mass may be sixty pounds. This would yield a three to one ratio of first mass—the drive mass—to the second mass—the driven mass which includes the trough or product delivery apparatus.

SUMMARY OF THE INVENTION

This invention provides flexibility in the selection and use of drive means, typically vibratory exciters, for use with vibratory feeders. The flexibility stems from the use of a single basic housing that can be configured numerous different ways depending on the application requirement.

The basic housing can be equipped with side plates of a given mass determined by the mass ratio between the feeder driving mass and the feeder driven mass. As the driven mass changes for different applications, the mass of the vibratory exciter can be changed by changing side plates. A new exciter need not be purchased.

Another aspect of this feeder drive means is that more than one drive means can be linked or coupled with other similar drive means to provide a unified structural drive means having multiples for more of driving capacity. The drive means can be linked together in a tandem arrangement where one or more drive means are aligned along a common drive line. Alternatively the drive means can be coupled together so they each drive along a separate but parallel drive line than the first of these configurations the normal side plates are replaced with special side plates with mounting locations for two or more vibratory exciters on each plate. The drive means will be aligned relatively "front-to-back" and thus allow multiple drives of a specific size that will collectively have enough power to drive a long trough of substantial rigidity. This is an improvement over prior multiple drive unit machines wherein the trough had to be a massingly rigid structure in order to prevent trough flex and the decrease of feeder delivery capacity and smooth operation.

BRIEF DESCRIPTION OF THE DRAWINGS

In the drawings:

FIG. 1 shows a three quarter projected view of a housing component of the invention;

FIG. 2 is an exploded view of a single vibratory exciter element;

FIG. 3 is an orthographic projection of a vibratory feeder of the type contemplated by the inventor;

FIG. 4 is an embodiment of the invention wherein a pair of vibratory exciter elements are coupled together in tandem;

FIG. 5 is an embodiment of the invention wherein three vibratory exciter elements are coupled in tandem;

FIG. 6 is an embodiment of the invention wherein a pair of vibratory exciter elements are coupled together in a siamesed relationship;

FIG. 7 is an embodiment of the invention wherein a plurality of vibratory exciter elements are coupled together in a siamesed relationship;

FIG. 8 is an embodiment of the invention wherein a plurality of vibratory exciter elements are coupled tougher in a tandem and siamesed relationship.

DETAILED DESCRIPTION OF THE INVENTION

The apparatus of the invention and various configurations of the invention are presented in the drawing figures. These figures as well as the following description should be sufficient to provide on understanding of the invention to a person having ordinary skill in the are. The following detailed description of the invention sets forth the best made contemplated by the invention.

FIG. 1 presents the first building block of the invention. It shows a casting 10 of rather complex configuration that is used as the housing for the vibratory drive unit of the apparatus presented herein. This housing 10 includes elongated protrusions 12a and 12b on the top of the housing. These elongated protrusions are primarily incorporated to increase the mass of the housing 10. The housing generally defines an enclosed-on-four-sides cavity with a back wall 14 provided with spring mounts 16a and 16b protruding therefrom. Additionally, projection 18 extends from the back wall. This projection is provided with a port 20 through which an electrical connection can extend to provide current to the electromagnet residing in the cavity of the housing. A plurality of supports such as support 22 extend downwardly from the bottom of the spring mounts. In FIG. 1, there would be four of these supports.

The bottom 24 of the housing connects the back wall 14 to the front wall 26. The interior of the bottom wall 24 may include a plinth 28 that is used to support the electromagnet inside the housing.

The front wall 26 includes spring mounts, one shown as 30, similar to the spring mounts 16a and 16b integral with the back wall 14. These spring mounts are also equipped with supports 22. An alternative configuration for the spring mounts 30 on the back and front walls is to have the mounts corrected together to present are long mounts on each of the front and back walls. The front wall may include an aperture 32.

A significant feature of the housing 10 is the surface 34. The housing has this surface on either side of the central cavity of the housing. The surface 34, and the unseen surface on the other side of the cavity are shown as flat surfaces in this preferred embodiment however, that is not a requirement of the design. These surfaces are designed to accommodate what will be termed "select masses" which will be attached or fastened to the housing 10 to generally enclose the interior of the cavity. Threaded bores, such as 36, are provided as needed to attach the select masses to the housing.

FIG. 2 shows a more complete, however, "exploded" for clarity, electromagnetic exciter as used in this invention. In this figure, the housing 10 is shown with the electromagnetic motor 38, conventional in operation and design, mounted in the cavity of the housing. The power cable 40 enters the port 20 and is electrically connected to the electromagnetic motor.

Vibration isolators, such as rubber isolators 42, are attached to the supports 22. These vibration isolators will be the supports between a complete vibratory device, such as a conveyor and the support surface on which the device is positioned.

The "select masses" 44 and 46 are shown in this FIG. 2. These are generally flat plates having a face surface and an obverse surface of massive material such as steel or iron plates that are fastened to either side of the housing to complete the structure of the drive means (except for the spring system). These select masses will have a mass greater than five percent of the mass of the housing 10 (the core mass) and the sum of the mass of the select masses and the housing will be ratioed to the mass of the second mass of the two mass system to produce a corresponding displacement ratio between the first and second masses. These plate can be attached by screw type fasteners to the housing by means of screws or bolts (not shown) threaded into the treaded bores such as 36. The select masses are selected from a selection of massive plates of different masses to allow more or less mass to be appended to the housing 10. Since the housing 10, the electromagnet 38 and the side plates, that is the select masses, make up the bulk of the first mass in the two mass vibratory feeder presented herein, it is advantageous to be able to adjust the mass of this first mass by adding or taking away certain massive elements. Thus, these side plates can be selected to allow tuning of the first mass relative to the second mass through the easy and expedient means of simply selecting and appending the proper select mass/side plates to tune to the mass of the driven or second mass of the feeder.

The second mass of the system includes, in this preferred embodiment, a trough support 48. This trough support 48 will be mounted through spring system, represented by springs such as 50a and 50b (as well as two other similar springs shown in the preferred embodiment of FIG. 2), to the first mass by means of fasteners such as 52 which are threaded through apertures in the springs into the threaded aperture such as 54 of the housing 10. A washer type means 56 may be used between the head of the fasteners 52 and the surface of the springs 50.

The springs 50 may be of any spring material used in vibratory exciters. The springs used in the preferred embodiment are non-metallic laminated or pultruded fiberglass/resin springs of a type well known in the vibratory feeder industry and used on other types of vibratory feeders of FMC Corporation and are available form FMC.

The trough support 48 may be equipped with threaded bores as necessary (not shown) to accommodate the trough shown, for example, in FIG. 3.

FIG. 3 shows a typical feeder, generally 54, with an elongated trough structure 56. This is simply a representative trough of the type used in vibratory feeders. It is provided as an illustration of a typical trough. The feeder trough 56 is mounted to the trough support 48, only a small portion of which is usable in FIG. 3. Produce to be conveyed would normally be loaded into the trough in the end of the trough proximate to the feeder drive, generally 58. Product to be conveyed, for instance granular material, such as breakfast cereal, will be moved by vibratory motion—a technique well known in the industry, to the discharge or exit end, generally 60 of the feeder trough. The entire vibratory feeder device would be placed on a surface with rubber vibration isolators such as 42 in contact with such surface.

The select masses 44, one on each side of the feeder drive has been selected to be a proper total mass such that the relationship between the drive mass or first mass and the second or driven mass comprising the trough support, the feeder trough and the expected mass of product in the trough, is such to ensure good feed propagation. The mass ratio for good feed is well known in the industry and a base line ratio can be easily determined from readily available literature available to a person of ordinary skill in the art. The provision of the easily removable "select masses" does however give the equipment designer the flexibility to fine tune the mass ratio by the selection of proper selected masses to use in a given situation to maximize the feed rate. It also gives the manufacturer the ability to provide a wide range of first mass masses with a single casting (the housing casting) as a core element but through the use of different select masses a range of driven masses can be accommodated.

The general arrangement of a single vibratory drive shown in FIG. 3 is just one embodiment considered by the inventors. It has the utility of replaceable side plates or select masses that give it a wide range of adaptability to various trough masses.

Several other embodiments, also preferred embodiments are shown in FIGS. 4–8. These embodiments show the advantage and facility of the select mass interchangeability with the FIG. 3 general embodiment, but also provide a means of mounting the vibratory drives in tandem, as shown in FIGS. 4 and 5 or siamesed as shown in FIGS. 6 and 7. A combination tandem and siamesed configuration is shown in FIG. 8.

The concept of the tandem configuration is clearly shown in FIGS. 4 and 5. The FIG. 4 embodiment shows select masses 62 and 64 which are long enough to be simultaneously mounted to a first 66 and to a second 68 housing. The method of connection between these side plates and the housing is as shown in FIG. 2 as are all other aspects of the embodiment—except the side plates.

The advantage of this tandem mounting is that the first mass, now basically the two long select masses and the two drive units are integrated from standard components into a drive system that doesn't require the significant structural enhancement of a long feeder trough, which would add mass to the trough and require an even greater amount of power from the electromagnetic drive units.

Similarly, FIG. 5 presents even longer select masses, 70 and 72 which tie together a plurality of feeder drives. In this case three feeder drives share the pair of side plates 70 and 72.

It should be pointed out that the select masses for multiple inline or tandem embodiments may also be selected to be of greater or lesser mass depending on the relationship or ratio desired between the first mass and the second or driven mass. This gives even greater range to the applicability of a limited stock of basic component to provide appropriate driving power to a wider range of driven mass configurations than the prior art teaches.

FIG. 6 and 7 are siamesed configurations of multiple housing and drive units. Typically a first select mass 74a and 74b will attach to the outboard side of the outbound housing. That same mass of select mass will be on the other end of the array as well-shown by 76a and 76b. Between the housing a single select mass could be used or no select mass could be used.

It may also be appropriate to use two select mass or side plates between the adjacent housing. In this case the adjacent side plates would be fastened together face-to-face independent of their mounting to the housing. The configuration may be somewhat easier to assembly than the embodiment with a signal plate between housings.

This siamese array or configuration is adaptable to wide feeder trough installations where a very wide trough is used. It would be conceivable that any number of units could be mounted in this siamesed configuration. There are practical limitations however and realistically probably less than ten units would be siamesed together into a single unit. Two or three unit assemblies as shown in FIGS. 6 and 7 may be the most usual multiple configuration.

FIG. 8 presents a hybrid configuration of tandem and siamesed units. The long side plates 78a and 78b are matched with interior side plates 80a and 80b all of appropriate select masses to provide the first mass desired mass as well as integrate the structure. The dual central side plates show a preferred embodiment of siamesed assemblies. This configuration could conceivable be used to drive a device six times the size of the device shown in FIG. 3 however the drawings are not intended to be necessary to scale and are present to show the concept sought to be protected.

In light of that the appended claims attempt to broadly cover the concept set forth herein. Nuances of design are contemplated as following within the scope of the claimed invention.

What is claimed is:

1. In a vibratory device including a first mass, a second mass, spring means connecting said first mass to said second mass, motion inducing means carried by one of said first or second masses, the improvement comprising:

said first mass comprising at least one core mass, at least a first select mass secured to one end of said at least one core mass and a second select mass secured to another end of said at least one core mass;

wherein the sum of the mass of said select masses and said core mass is ratioed to the mass of said second mass to produce a corresponding displacement ratio between said first and second masses.

2. In a vibratory feeder having a first mass, a second mass, spring means connecting said first mass to said second mass, a motion inducing means, said second mass including a driven means, the improvement comprising:

said first mass having a plurality of core masses, a plurality of appended select masses each having a face surface, at least one of said plurality of appended select masses having its face surface proximate to said face surface of another of said plurality of appended select masses.

3. The invention in accordance with claim 2 wherein said approximate face surfaces of said plurality of appended select masses are fixedly attached to one to another.

4. The invention in accordance with claim 3 wherein said appended select masses are fixedly attached one to another by means of threaded fasteners.

5. The invention in accordance with claim 2 wherein two of said face surfaces are not proximate another of said face surfaces.

6. The invention in accordance with claim 2 wherein each of said core masses has a mass and each of said appended select masses, other than said appended select masses having their said face surfaces proximate to another face surface of one of said plurality of appended select masses, has a mass greater than five percent of the mass of each of said core masses.

7. The invention in accordance with claim 6 wherein the mass of select masses other than said appended select masses having their said face surfaces proximate to another face surface of one of said plurality of appended select masses, has a mass in the range of between five percent and one hundred percent of the mass of each of said core masses.

8. The invention in accordance with claim 7 wherein the mass of select masses other than said appended select masses having their said face surfaces proximate to another face surface of one of said plurality of appended select masses, has a mass in the range of between five percent and one hundred percent of the mass of each of said core masses has a mass in the range of between ten percent and one hundred percent of the mass of each of said core masses.

9. The invention in accordance with claim 2 wherein each of said core masses has a mass and each of said appended select masses has a mass greater than five percent of the mass of each of said core masses.

10. The invention in accordance with claim 7 wherein the mass of each of said appended select masses has a mass in the range of between five percent and one hundred percent of the mass of each of said core masses.

11. In a vibratory apparatus having a first mass, a second mass, spring means connecting said first mass to said second mass, a motion inducing means, said second mass including a driven means, the improvement comprising:

a first core mass;

a first appended select mass having a face surface and an obverse surface, said first appended select mass appended to said first core mass with said obverse surface facing said first core mass;

a second appended select mass having a face surface and an obverse surface, said second appended select mass appended to said first core mass with said obverse surface facing said first core mass;

a third appended select mass having a face surface and an obverse surface, said third appended select mass fastened to said second appended select mass with the face surface of said third appended select mass proximate said face surface of said second appended select mass;

a second core mass appended to said obverse surface of said third appended select mass;

a fourth appended select mass fastened to said second core mass.

12. In a vibratory apparatus having a first mass, a second mass, spring means connecting said first mass to said second mass, a motion inducing means, said second mass including a driven means, the improvement comprising:

a first mass having a plurality of core masses;

a plurality of selected bodies each having a face surface and an obverse surface on the side of said selected body opposite said face surface;

a first one of said plurality of core masses attached to two of said plurality of selected bodies with said obverse surface of each selected body proximate to said first one of said plurality of core masses;

a second one of said plurality of core masses attached to said two of said plurality of selected bodies with said obverse surface of each selected body proximate to said second one of said plurality of core masses.

13. The invention in accordance with claim 12 wherein a further one of said plurality of core masses is attached to said two of said plurality of appended select masses with said obverse surface of each said appended select mass proximate to said second one of said plurality of core masses.

14. The invention in accordance with claim 13 wherein a further one and more of said plurality of core masses are each attached to said two of said plurality of appended select masses with said obverse surface of each said appended select mass proximate to said second one of said plurality of core masses.

15. The invention of claim 1 wherein said at least one core mass comprises two or more core masses, said core masses being disposed in tandem relationship.

16. The invention of claim 1 wherein said at least one core mass comprises two or more core masses, said core masses being disposed in siamesed relationship.

17. The invention of claim 1 wherein said at least one core mass comprises three or more core masses, said core masses being disposed in tandem and siamesed relationship.

18. The invention of claim 1 wherein said first and second select masses having a mass greater than five percent of said core mass.

* * * * *